US012578289B2

(12) United States Patent
Gateshki et al.

(10) Patent No.: US 12,578,289 B2
(45) Date of Patent: Mar. 17, 2026

(54) X-RAY APPARATUS AND METHOD FOR ANALYSING A SAMPLE

(71) Applicant: Malvern Panalytical B.V., Almelo (NL)

(72) Inventors: Milen Gateshki, Almelo (NL); Detlef Beckers, Almelo (NL)

(73) Assignee: Malvern Panalytical B.V., Almelo (NL)

( * ) Notice: Subject to any disclaimer, the term of this patent is extended or adjusted under 35 U.S.C. 154(b) by 146 days.

(21) Appl. No.: 18/599,964

(22) Filed: Mar. 8, 2024

(65) Prior Publication Data

US 2024/0302303 A1     Sep. 12, 2024

(30) Foreign Application Priority Data

Mar. 9, 2023    (EP) .................................... 23161053

(51) Int. Cl.
G01N 23/207          (2018.01)
G01N 23/20025        (2018.01)

(52) U.S. Cl.
CPC ..... G01N 23/207 (2013.01); G01N 23/20025 (2013.01); *G01N 2223/0563* (2013.01);
(Continued)

(58) Field of Classification Search
CPC .......... G01N 23/20008; G01N 23/207; G01N 23/20025; G01N 2223/1016;
(Continued)

(56) References Cited

U.S. PATENT DOCUMENTS 6,310,937 B1    10/2001 Van Den Hoogenhof
10,145,808 B2 *  12/2018 Omote ................. G01N 23/207
(Continued)

FOREIGN PATENT DOCUMENTS

EP       2741309 A2    6/2014
EP       3294044 A1    3/2018

OTHER PUBLICATIONS

Harrington, George F. et al: "Back-to-Basics tutorial: X-ray diffraction of thin films", Journal of Electroceramics, Oct. 13, 2021, pp. 141-163, vol. 47, Springer Science+Business Media, LLC.
(Continued)

*Primary Examiner* — Irakli Kiknadze
(74) *Attorney, Agent, or Firm* — Cesari and McKenna, LLP

(57)          ABSTRACT
The present invention relates to an X-ray analysis apparatus and an X-ray analysis method for analysing a sample. The X-ray analysis method involves using a first slit between the sample and a position sensitive X-ray detector to analyse the sample, including calculating a detection angle based on a distance $L_1$ between the first slit and the X-ray detector, and the position of the first detection element in the array of detection elements. The X-ray analysis apparatus comprises a processor that is configured to analyse data from an X-ray detector comprising an array of detection elements. The processor is configured to receive data comprising an X-ray intensity detected at the first detection element of the array of detection elements and calculate the detection angle based on the distance $L_1$ between the first slit and the X-ray detector, and the position of the first detection element in the array of detection elements.

18 Claims, 9 Drawing Sheets

(52) U.S. Cl.
   CPC ................ *G01N 2223/1016* (2013.01); *G01N 2223/313* (2013.01); *G01N 2223/501* (2013.01)

(58) Field of Classification Search
   CPC ..... G01N 2223/0563; G01N 2223/501; G01N 2223/313; G01N 23/20; G01N 2223/056; G01N 2223/052; G01N 2223/05; G01N 23/223; G01N 2223/33; G01N 2223/316; G01N 23/20016; G01N 2223/303; G01N 23/2055; G01N 23/201; G01N 2223/611; G01N 2223/054; G01N 23/04; G01N 23/20075; G01N 2223/30; G01N 2223/32; G01N 2223/3308; G01N 2223/61; G01N 2223/6116; G01N 23/2076; G21K 1/025; G21K 1/02; G21K 1/10; A61B 6/4266; A61B 6/4275; A61B 6/035; A61B 6/03; A61B 6/4035; A61B 6/508; A61B 6/032; A61B 6/5241; A61B 6/027; G01T 1/1648; G06T 11/006; H01L 22/12
   USPC ......................................... 378/70, 71, 84, 86
   See application file for complete search history.

(56)                   References Cited

U.S. PATENT DOCUMENTS

2005/0226379  A1 *  10/2005  Fewster ........... G01N 23/20008
                                                              378/71
2017/0160213  A1 *   6/2017  Sato .................... G01N 23/223
2017/0318652  A1     11/2017  Meiler et al.
2017/0363550  A1 *  12/2017  Kobayashi ....... G01N 23/20008
2019/0277781  A1 *   9/2019  Murakami ....... G01N 23/20008
2023/0258586  A1      8/2023  Konaka

OTHER PUBLICATIONS

Cline, James P. et al: "The Optics and Alignment of the Divergent Beam Laboratory X-ray Powder Diffractometer and its Calibration Using NIST Standard Reference Materials", Journal of Research of the National Institute of Standards and Technology, Sep. 5, 2015, pp. 173-222, vol. 120, National Institute of Standards and Technology.

Schuster, Manfred et al, "Gobel Mirrors—a Breakthrough for Applications of X-Ray Diffraction", pp. 9-13, Bruker AXS GmbH.

The MetalJet Technology Brochure, 4 p. 2021, Excillium AB, Kista, Sweden.

Boundaries are meant to be pushed, Introducing Metal Jet E1 +160 kV, 4 pages, Excillium AB, Kista, Sweden.

Larsson, D. H. et al., "A 24 keV liquid-metal-jet x-ray source for biomedical applications", Review of Scientific Instruments, Dec. 1, 2011, pp. 123701-1 to 123701-5, vol. 82, American Institute of Physics.

Fontaine, et al., Fast and Adjustable-Resolution Grazing-Incidence X-Ray Liquid Surface Diffraction, Review of Scientific Instruments, Oct. 1, 2004, pp. 3097-3106, vol. 75 (No. 10), American Institute of Physics.

* cited by examiner

X-RAY APPARATUS AND METHOD FOR ANALYSING A SAMPLE

CROSS REFERENCE TO RELATED APPLICATION

This application claims the benefit of and priority to European Patent Application No. EP 23161053.6, filed on Mar. 9, 2023, the entire content of which is owned by the assignee of the instant application and incorporated herein by reference in its entirety.

FIELD OF THE INVENTION

The present invention is directed to an X-ray analysis apparatus for analysing samples and a method of analysing a sample by X-ray analysis. In particular, the present invention is directed to providing X-ray analysis using an apparatus that is suitable for multiple X-ray applications whilst being cost-efficient and easy to align or adjust.

BACKGROUND

X-ray analysis is widely used to carry out non-destructive characterisation of samples. Information can be obtained by analysing X-rays that have been scattered, reflected or diffracted from a sample. For example, X-ray diffraction (XRD) can be used to analyse the crystalline form and chemical composition of samples, whereas X-ray reflectometry (XRR) is particularly useful for characterising surfaces and thin layers. By using grazing incidence X-ray diffraction (GIXRD), it is also possible to investigate the crystalline structure of surfaces or thin films.

In general, methods of X-ray analysis involve directing a beam of X-rays from an X-ray source to a sample. X-rays are then scattered, reflected or diffracted from the sample to an X-ray detector. Some X-ray diffraction apparatuses use Bragg-Brentano parafocusing geometry. This provides high resolution and high intensity but requires the samples to be carefully prepared (measurements are sensitive to sample thickness and height) and the apparatus to be precisely aligned with the sample. Parallel beam geometry can be used as an alternative to Bragg-Brentano parafocusing geometry. The use of a parallel X-ray beam incident on the sample in parallel beam geometry means that the X-ray measurements are no longer sensitive to sample thickness or height.

X-ray analysis techniques using a parallel beam geometry typically require the use of a parallel plate collimator positioned between the sample and the X-ray detector to collimate X-rays from the sample. However, relying on parallel plate collimators also presents significant challenges. In particular, they are difficult to align, bulky, and expensive. They typically have a fixed acceptance angle, which means that the whole collimator needs to be replaced if the user wants to vary the acceptance angle—for example, to adjust resolution. Aligning parallel plate collimators is a time consuming and difficult process, which is typically carried out in the factory rather than by the user, increasing the cost of production. A user can exchange parallel plate collimators, to vary the acceptance angle, either manually or by automation. Due to space constraints, and since parallel plate collimators are costly, there is a practical limit to the number of parallel plate collimators that can be used. Consequently, the user will have limited options for adjusting the resolution of the system. Accordingly, an X-ray analysis apparatus that uses a parallel plate collimator has limited functionality since the user is unable to adjust the system resolution conveniently.

More generally, a given X-ray analysis apparatus will have to be reconfigured to perform different X-ray analysis methods. It would be desirable to provide an X-ray analysis apparatus that is capable of delivering high quality measurements for multiple different X-ray analysis applications, such as for both GIXRD and XRR and/or power diffraction analysis, with minimal reconfiguration.

SUMMARY

According to a first aspect of the invention there is provided a method of X-ray analysis for analysing a sample, the method comprising: using an X-ray source to irradiate a surface of the sample with a parallel beam of incident X-rays; passing a plurality of X-rays from the sample through a first slit, towards an X-ray detector comprising an array of detection elements, wherein the first slit is positioned at a distance $L_1$ from the X-ray detector; detecting the plurality of X-rays from the sample at the X-ray detector; and for a first detection element of the array of detection elements, calculating a detection angle associated with an X-ray path of an X-ray from the sample that passes through the first slit to the first detection element, wherein the calculation of the detection angle uses the distance $L_1$ and the position of the first detection element in the array of detection elements; the method further comprising assigning an X-ray intensity value measured at the first detection element to the detection angle.

The X-rays from the sample may be diffracted, scattered and/or reflected by the sample. The X-ray detector is a position sensitive X-ray detector (i.e. it comprises multiple detection elements). Accordingly, it is possible to determine the position on the X-ray detector that the X-rays from the sample are detected. In many conventional X-ray analysis methods, a parallel plate collimator is positioned between the X-ray detector and sample. However, arrangements including parallel plate collimators are expensive and offer limited flexibility in terms of varying the acceptance angle.

The inventors have realised that by providing a method whereby the detection angle is calculated using the distance $L_1$ it is possible to carry out parallel beam X-ray analysis using a simple configuration comprising a slit (instead of a parallel plate collimator) between the X-ray detector and sample. In particular, it is possible to perform X-ray analysis using a system that is cost-effective and easier to align, whilst still achieving high quality results. Further, by using parallel beam geometry, the measurements are not sensitive to either the height or thickness of the sample.

The position of the first detection element in the array of detection elements may be determined relative to a reference detection element. The X-ray source may comprise an X-ray tube configured to generate a beam of X-rays and an X-ray optic configured to collimate the beam from the X-ray tube to provide the parallel beam of X-rays. The parallel beam of incident X-rays is a beam of substantially parallel X-rays— that is, divergence of the parallel beam of incident X-rays may be greater than 0 degrees. Typically, the divergence of the parallel beam of incident X-rays is equal to or less than 0.5°. Preferably, the divergence of the parallel beam of incident X-rays is equal to or less than 0.05°.

The detection angle may be the diffraction angle $2\theta$ between the parallel beam of incident X-rays from the X-ray source and the X-ray path of an X-ray from the sample that passes through the first slit to the first detection element. The angle $2\theta$ can be used for measurements carried out in reflection geometry or measurements carried out in transmission geometry. Alternatively, for measurements carried out in reflection geometry and in which the surface of the sample is substantially even (i.e., the sample surface has a constant height), the detection angle may be the angle $\alpha$. The angle $\alpha$ is the angle between the X-ray path of an X-ray from the sample that passes through the first slit to the first detection element and a reference plane (e.g. the irradiated surface of the sample).

The method may further comprise: calculating, for each of a plurality of detection elements of the array of detection elements, a detection angle associated with an X-ray path from the sample to the respective detection element; and assigning, for each of the plurality of detection elements of the array of detection elements, a respective X-ray intensity value measured at the respective detection element to the respective calculated detection angle. The method may comprise calculating a diffraction angle $2\theta$ for each detection element in the array. Alternatively, the method may comprise calculating a diffraction angle for each of a subset of the detection elements in the array.

In some embodiments, calculating detection angles for each detection element in the array may involve calculating detection angles for each and every detection element in the array. In other embodiments, calculating detection angles for each detection element in the array may involve calculating detection angles for each of a subset of the detection elements in the array.

In embodiments where the array of detection elements is a two-dimensional array, the detection elements of the two-dimensional array will be arranged in rows and columns. Preferably, in embodiments where the two-dimensional array is configured to operate as a one-dimensional detector, each column of the two-dimensional array is considered to correspond to one channel of the one-dimensional detector. That is, the intensities detected at each detector element of that column are summed so that the column acts as a single detection element. The skilled person will understand that in some embodiments, it will be more convenient for each row of the two-dimensional array to be treated as one channel of the one-dimensional detector (rather than each column).

Therefore, in embodiments comprising a two-dimensional array operating as a one-dimensional array, the method may comprise: calculating, for each column or row of the two-dimensional array, a detection angle associated with an X-ray path from the sample to the respective column or row; and assigning, for each column or row of the two-dimensional array, a respective X-ray intensity value measured at the respective row or column to the respective calculated detection angle.

The method may further comprise carrying out an angular scan by moving the X-ray detector and the first slit relative to the sample. In particular, the method may involve using a goniometer to rotate the X-ray detector and the slit around the centre of the goniometer.

Performing an angular scan facilitates the measurement of X-ray intensity as a function of detection angle. Scanning the X-ray detector and first slit relative to the sample may enable detection of X-rays travelling towards the X-ray detector over a wider range of detection angles. Multiple detection angles may be calculated for each position of the first slit and the X-ray detector relative to the sample. For each position of the X-ray detector in an angular scan, the method may comprise calculating a respective detection angle for each of the detection elements (or each of a sub-set of the detection elements). The method may further comprise assigning the respective X-ray intensity measured at the respective detection element to the respective calculated detection angle.

In embodiments involving carrying out an angular scan, the method may be a method of grazing incidence X-ray diffraction analysis; wherein the surface of the sample is irradiated by the parallel beam of incident X-rays at a grazing incidence angle; and the angular scan is carried out by moving the X-ray detector and the first slit relative to the sample while the parallel beam of incident X-rays irradiates the sample at the grazing incidence angle.

The angular scan may be performed with the incident beam irradiating the sample at the grazing incidence angle. It will be appreciated that grazing incidence angles are typically nearly parallel to the surface of the sample so that penetration of the X-ray into the sample is limited. That is, the acute angle between the incident beam of X-rays and the surface of the sample may be equal to or less than 3°, and preferably greater than 0° and equal to or less than 1.5°. Thereby, properties of the surface of the sample or of thin film samples can be determined.

The X-ray detector may be a one-dimensional X-ray detector. The array of detection elements of the one-dimensional X-ray detector may be a single line of detection elements or the array may be a two-dimensional array of detection elements operated as a one-dimensional detector, as described above.

The method may further comprise changing the measurement resolution by adjusting the width of the first slit; wherein the first slit has an adjustable width, and preferably wherein the first slit is a motorised slit; or wherein the first slit is part of an adjustable-width slit arrangement, wherein the adjustable-width slit arrangement includes a second slit having a different width from the first slit, and the method further comprises replacing the first slit with the second slit to change the measurement resolution.

By providing an adjustable slit, the resolution can be easily adjusted. This provides a significant advantage over configurations relying on parallel plate collimators, since the resolution can be changed conveniently by adjusting the slit width rather than completely replacing the parallel plate collimator. In systems relying on parallel plate collimators, a different parallel plate collimator would be required for each different resolution setting. Therefore, using an adjustable slit is a much more convenient way to provide a system that can operate at different resolution settings.

The method may further comprise calculating each respective detection angle using: a reference angle between a line from the centre of a reference element through the first slit and a reference plane; and the ratio between the product of a pitch, d, of the X-ray detector and $\Delta n+1$, and the distance $L_1$; wherein $\Delta n$ corresponds to the number of detection elements between the respective detection element and the reference element. Where the method comprises calculating the detection angle for a single detection element (e.g. the first detection element), the respective detection angle is the detection angle associated with that detection element and $\Delta n$ corresponds to the number of detection elements between that detection element and the reference element. The pitch, d, of the X-ray detector is the distance between the centres of adjacent detection elements of the X-ray detector. The parameter $\Delta n$ is the number of detection elements between the detection element and the reference element, not including the detection element or the reference element. For example, if the first element of a one-dimensional array is the detection element and the tenth element of the one-dimensional array is the reference element, then $\Delta n=8$.

The product of $\Delta n+1$ and the pitch of the X-ray detector corresponds to the distance between the reference element and the detection element for which the detection angle is calculated. The skilled person will understand that the same calculation can be performed using different notation. For example, the method may comprise calculating: a reference angle between a line from the centre of a reference element through the first slit and a reference plane; and the ratio between the product of the pitch, d, of the X-ray detector and a detection element index, n, and the distance $L_1$ wherein the detection element index, n, corresponds to the index of the detector element for which the detection angle is being calculated, and the reference element corresponds to n=0. The product of the detection element index, n, and pitch of the X-ray detector corresponds to the distance between the reference element and the detection element for which the detection angle is calculated. The index value n relates to the position of the detection element relative to the reference element.

When the detection angle is the angle $2\theta$, the reference plane contains the line orientated along the beam direction of the parallel beam of incident X-rays from the X-ray source. In other words, the detection angle $2\theta$ corresponds to the angle between a line from the centre of the reference element through the first slit and the beam direction of the parallel beam of incident X-rays from the X-ray source. The line orientated along the beam direction corresponds to the path of the parallel beam of incident X-rays from the X-ray source to the sample. A reference plane containing the line orientated along the beam direction of the parallel beam of incident X-rays from the X-ray source can be used for measurements carried out in either reflection or transmission geometry. Alternatively, when the detection angle is the angle $\alpha$, the reference plane is parallel to the surface of the sample.

In embodiments of the invention where multiple detection angles are calculated, each detection angle may be calculated using: a reference angle between a line from the centre of a reference element through the first slit and a reference plane; and the ratio between the product of the pitch, d, of the X-ray detector and $\Delta n+1$, and the distance $L_1$ wherein $\Delta n$ corresponds to the number of detector elements between each respective detection element and the reference element. The reference element may be the centre element of the X-ray detector.

The method may further comprise: carrying out an angular scan by moving the X-ray detector and the first slit relative to the sample, wherein the method of X-ray analysis is a method of grazing incidence X-ray diffraction analysis; wherein the surface of the sample is irradiated by the beam of incident X-rays at a grazing incidence angle; and wherein the angular scan is carried out by moving the X-ray detector and the first slit relative to the sample while the beam of incident X-rays irradiates the sample at the grazing incidence angle; and the method further comprising making an X-ray reflectometry measurement.

The apparatus can be conveniently used for a variety of parallel X-ray beam applications. In particular, the apparatus can be used to carry out both grazing incidence X-ray diffraction analysis (GIXRD) and X-ray reflectometry (XRR) measurements. The XRR measurement and GIXRD measurements may be carried out sequentially. Thereby, since the need to reconfigure the apparatus is reduced/avoided, different measurements can be made more conveniently.

The X-ray reflectometry measurement may comprise irradiating the sample with a parallel beam of incident X-rays for a range of incident angles and receiving X-rays reflected by the sample at the X-ray detector, wherein the intensity is determined by operating the X-ray detector in 0-D mode (i.e. intensity is determined using a single detection element, preferably the central detection element).

The method may further comprise: carrying out an angular scan by moving the X-ray detector and the first slit relative to the sample; for each position of the angular scan: calculating, for each of a plurality of detection elements of the array of detection elements, a detection angle associated with an X-ray path from the sample to the respective detection element; assigning, for each of the plurality of detection elements of the array of detection elements, a respective X-ray intensity value measured at the respective detection element to the respective calculated detection angle; and optionally combining the X-ray intensity values that have been assigned to the same detection angle but measured at different detection elements to generate an X-ray intensity-detection angle scan; or generating a plot representing the measured X-ray intensities corresponding to each calculated detection angle at each detection element; selecting a portion of the plot representing the sample; and generating an X-ray intensity-detection angle scan from the X-ray intensity data corresponding to the selected portion of the plot representing the sample.

By selecting a portion of the data that represents X-rays diffracted from the sample, rather than background signal (e.g. signal from a region of substrate surrounding the sample) it is possible to generate a more useful X-ray intensity-detection angle scan. However, in some embodiments, the plot will indicate that all the detected X-rays have been diffracted from the sample. In these embodiments, the portion of the plot representing the sample selected may be the full area of the plot.

In embodiments where the array of detection elements is a two-dimensional array comprising rows and columns, the method may further comprise: carrying out an angular scan by moving the X-ray detector and the first slit relative to the sample; for each position of the angular scan: calculating, for each column or row of the two-dimensional array, a detection angle associated with an X-ray path from the sample to the respective column or row; assigning, for each column or row of the two-dimensional array, a respective X-ray intensity value measured at the respective row or column to the respective calculated detection angle; and optionally combining the X-ray intensity values that have been assigned to the same detection angle but measured at different detection elements to generate an X-ray intensity-detection angle scan; or generating a plot representing the measured X-ray intensities corresponding to each calculated detection angle at each column or row of the two-dimensional array; selecting a portion of the plot representing the sample; and generating an X-ray intensity-detection angle scan from the X-ray intensity data corresponding to the selected portion of the plot representing the sample.

The first slit may be part of a slit arrangement, wherein the slit arrangement comprises a second slit adjacent to the first slit and at a distance $L_2$ from the X-ray detector; the method further comprising: passing a plurality of X-rays from the sample through the second slit, towards the X-ray detector; detecting the plurality of X-rays passing through the first slit at a first region of the X-ray detector comprising the first detection element, and detecting the plurality of X-rays passing through the second slit at a second region of the X-ray detector comprising a second detection element; for the first detection element, calculating the detection angle using the position of the first detection element relative to a first reference element; for the second detection element, calculating a second detection angle associated with an X-ray path of an X-ray from the sample through the second slit to the second detection element, wherein the calculation of the second detection angle uses the distance $L_2$ and the position of the second detection element relative to a second reference element; and assigning a second X-ray intensity value measured at the second detection element to the second detection angle; wherein the first and second reference elements are the centre element of the X-ray detector, or the first reference element is the centre element of the X-ray detector, and the second reference element is in the second region of the X-ray detector.

By providing multiple slits, each arranged to pass X-rays from the sample towards the X-ray detector, it is possible to create multiple non-overlapping images of the sample on the X-ray detector. The first region of the X-ray detector does not overlap with the second region of the X-ray detector.

In embodiments where the method includes a slit arrangement comprising two slits, the second reference element may be located at a distance from the first reference element that is equal to the distance between the first slit and the second slit along the direction parallel to the plane of the slits.

In embodiments involving multiple slits, where the X-ray detector is a two-dimensional array of detection elements that is configured to operate as a one-dimensional detector, the centre row or column may be treated as the centre element. In embodiments where the method includes a slit arrangement comprising multiple slits, the method may further comprise calculating for each of a plurality of detection elements of the region of the X-ray detector associated with a particular slit, a detection angle associated with an X-ray path of an X-ray from the sample through that particular slit to the respective detection element of the plurality of detection elements of the region of the X-ray detector associated with that particular slit. This calculation may be performed for each slit.

In embodiments wherein the slit arrangement includes two slits, the slit arrangement may further comprise a third slit positioned at a distance $L_3$ from the X-ray detector, wherein the first slit is positioned between the second slit and the third slit, the method further comprising: passing a plurality of X-rays from the sample through the third slit, towards the X-ray detector; detecting the plurality of X-rays passing through the third slit at a third region of the X-ray detector comprising a third detection element; and calculating a third detection angle associated with an X-ray path of an X-ray from the sample through the third slit to the third detection element, wherein the calculation of the third detection angle uses the distance $L_3$ and the position of the third detection element relative to a third reference element; and assigning a third X-ray intensity value measured at the third detection element to the third detection angle; wherein the first, second and third reference elements are all the centre element of the X-ray detector, or the first reference element is the centre element of the X-ray detector, the second reference element is in the second region of the X-ray detector and the third reference element is in the third region of the X-ray detector.

The third region may not overlap with the first region or the second region. In embodiments where the method includes a slit arrangement comprising three slits, the second reference element may be located at a distance from the first reference element that is equal to the distance between the first slit and the second slit, and the third reference element may be located at a distance from the first reference element that is equal to the distance between the first slit and the third slit.

In some embodiments that involve carrying out an angular scan by moving the X-ray detector and the first slit relative to the sample, and where $L_1$ is unknown, the method may comprise: determining a plurality of X-ray intensity profiles by, for each respective X-ray intensity profile, calculating a plurality of detection angles based on a respective estimated value of $L_1$; measuring the full width half maximum of a measurement peak of each intensity profile to determine the measurement resolutions of the intensity profiles; and outputting the intensity profile with the lowest measured value for full width half maximum.

The different X-ray intensity profiles may be calculated using different values for $L_1$. The measurement resolutions of the different intensity profiles can then be compared to determine the "true" value for $L_1$. The "true" value for $L_1$ may correspond to the value for $L_1$ that is associated with the highest resolution (the smallest value for the full width at half maximum).

In some embodiments that involve carrying out an angular scan by moving the X-ray detector and the first slit relative to the sample, and where $L_1$ is unknown, the method may further comprise: setting an initial value for $L_1$; performing the above-described method of X-ray analysis wherein each detection angle is calculated using the initial value of $L_1$, to determine an intensity profile of X-ray intensity with respect to calculated detection angle; measuring the full width half maximum of a measurement peak of the intensity profile to determine the measurement resolution; in response to determining that the measurement resolution is above a resolution threshold, changing the value of $L_1$ to an adjusted value of $L_1$; repeating the steps of performing the above-described method of X-ray analysis using the adjusted value of $L_1$, measuring the full width half maximum of a measurement peak of the intensity profile obtained by performing the X-ray analysis using the adjusted value of $L_1$ and changing the value of $L_1$ until the measurement resolution is determined to be below a resolution threshold (wherein measurement resolution below the resolution threshold represents high resolution). Alternatively, the steps may be repeated until the measurement resolution is determined to be above a resolution threshold (wherein measurement resolution above the resolution threshold represents high resolution). Any value can be chosen for the initial value of $L_1$.

The X-ray analysis method comprises using an X-ray source to irradiate a surface of the sample with a parallel beam of incident X-rays; passing a plurality of X-rays from the sample through a first slit, towards an X-ray detector comprising an array of detection elements, wherein the first slit is positioned at a distance $L_1$ from the X-ray detector; and detecting the plurality of X-rays from the sample at the X-ray detector.

The method may further comprise setting an initial value for $L_1$ and, calculating a detection angle for each detection element or each row/column of detection elements using the initial value for $L_1$. X-ray intensity values measured at the detection element/s may be assigned to the respective detection angles. In this way, an intensity profile of X-ray intensity with respect to calculated detection angle may be generated. The method may further comprise measuring the full width half maximum of a measurement peak of the intensity profile to determine the measurement resolution;

In response to determining that the measurement resolution is above a resolution threshold, the initial value of $L_1$ may be changed to an adjusted value of $L_1$. The adjustment of $L_1$, calculation of detection angle/s using the adjusted value of $L_1$ and intensity profiles based on the detection angles calculated using the adjusted value of $L_1$ can be repeated, until it is determined that the measurement resolution of the intensity profile is equal to or less than the resolution threshold.

A detection angle for each detection element or each row/column of detection elements may then be calculated using the adjusted value for $L_1$. X ray intensity values measured at the detection element/s may be assigned to the respective detection angles to generate a new intensity profile of X-ray intensity with respect to calculated detection angle (wherein the detection angles are calculated using the adjusted value for $L_1$. The full width half maximum of a measurement peak of the new intensity profile can be measured to determine the measurement resolution for that intensity profile.

In response to determining that the measurement resolution is above a resolution threshold, the adjusted value of $L_1$ may be changed, the detection angles re-calculated using the most recent adjusted value of $L_1$ and a new X-ray intensity profile generated based on the most recent adjusted value of $L_1$. These steps can be repeated until it is determined that the measurement resolution of the intensity profile is equal to or less than the resolution threshold.

The resolution threshold can be set by the user, according to the required resolution. It will be appreciated that there are various ways in which the adjustment to $L_1$ can be implemented. For example, the value of $L_1$ may be increased/decreased by (i) a predetermined increment or (ii) by a varying amount (i.e., the increase/decrease made to the previous value of $L_1$ may be different) based on a change in measurement resolution. The adjustment may increase or decrease the value of $L_1$ based on whether the measurement resolution associated with the previously generated X-ray intensity profile has brought measurement resolution closer to or further away from the resolution threshold. The resolution of the measurements is dependent on the value of $L_1$ used in the calculating step.

According to a second aspect of the invention, there is provided an X-ray analysis apparatus for analysing a sample, the X-ray analysis apparatus comprising: a processor configured to analyse data from an X-ray detector comprising an array of detection elements; wherein the processor is configured to: receive X-ray analysis data comprising an X-ray intensity detected at a first detection element of the array of detection elements; calculate a detection angle based on the distance $L_1$ between a first slit and the X-ray detector, and the position of the first detection element in the array of detection elements; and assign an X-ray intensity value measured at the first detection element to the detection angle. The processor may be configured to receive X-ray intensity data associated with multiple different detection elements and calculate detection angles associated with each detection element.

The X-ray analysis apparatus may further comprise: an X-ray source for providing a parallel beam of X-rays; a sample stage for supporting the sample; an X-ray detector comprising an array of detection elements; and a first slit positioned between the sample and the X-ray detector; wherein the X-ray detector is configured to detect a plurality of X-rays that pass from the X-ray source through the first slit, and the first slit is positioned at a distance $L_1$ from the X-ray detector. The X-ray source may comprise an X-ray tube configured to generate a beam of X-rays and an X-ray optic configured to collimate the beam from the X-ray tube to provide the parallel beam of X-rays.

The X-ray detector may be a one-dimensional X-ray detector. The one-dimensional X-ray detector comprises a linear array of detection elements. The X-ray detector may comprise a singular linear array of detection elements. Alternatively, the X-ray detector may comprise a two-dimensional array of detection elements that is configured to operate as a one-dimensional detector. Typically, the detection elements of the two-dimensional array will be arranged in rows and columns. Preferably, in embodiments where the two-dimensional array is configured to operate as a one-dimensional detector, each column of the two-dimensional array is considered to correspond to one channel of the one-dimensional detector. That is, the intensities detected at each detector element of that column are summed so that the column corresponds to a single detection element. The skilled person will understand that in some embodiments, it will be more convenient for each row of the two-dimensional array to be treated as one channel of the one-dimensional detector (rather than each column).

The first slit may have an adjustable width, and preferably the first slit is a motorised slit; or wherein the first slit is part of a slit arrangement, the slit arrangement may include a second slit having a different width from the first slit, wherein the first slit is configured to be replaced by the second slit and vice versa.

The processor may be configured to: calculate, for each of a plurality of detection elements of the array of detection elements, a detection angle associated with an X-ray path from the sample to the respective detection element; and assign, for each of the plurality of detection elements of the array of detection elements, a respective X-ray intensity value measured at the respective detection element to the respective calculated detection angle.

The apparatus may be configured to carry out an angular scan of the sample by moving the X-ray detector and the first slit and/or slit arrangement relative to the sample. The X-ray source may be arranged to irradiate the sample at a fixed grazing incidence angle and the X-ray detector, and the first slit may be movable relative to the sample to carry out an angular scan.

The processor may be configured to calculate the detection angle using a reference angle between a line from the centre of a reference element passing through the first slit and a reference plane; and the ratio between the product of a pitch, d, of the X-ray detector and $\Delta n + 1$, and the distance $L_1$; wherein $\Delta n$ corresponds to the number of detection elements between the detection element and the reference element. The reference element may be the centre element in the linear array of detection elements.

When the detection angle is the angle $2\theta$, the reference plane contains a line orientated along the beam direction of the parallel beam of incident X-rays from the X-ray source. In other words, the detection angle $2\theta$ corresponds to the angle between a line from the centre of the reference element through the first slit and the beam direction of the parallel beam of incident X-rays from the X-ray source. The line orientated along the beam direction corresponds to the path of the parallel beam of incident X-rays from the X-ray source to the sample. A reference plane containing the line orientated along the beam direction of the parallel beam of incident X-rays from the X-ray source can be used for measurements carried out in either reflection or transmission geometry. Alternatively, when the detection angle is the angle α, then the reference plane is parallel to the surface of the sample.

In embodiments of the invention where multiple detection angles are calculated, the processor may be configured to calculate each detection angle using: a reference angle between a line from the centre of a reference element and a reference plane; and the ratio between the product of the pitch, d, of the X-ray detector and $\Delta n+1$, and the distance $L_1$ wherein $\Delta n$ corresponds to the number of detection elements between each respective detection element and the reference element.

The processor may be configured to: calculate for each of a plurality of detection elements of the array of detection elements, a detection angle associated with an X-ray path from the sample to the respective detection element; assign, for each of the plurality of detection elements of the array of detection elements, a respective X-ray intensity value measured at the respective detection element to the respective calculated detection angle; wherein the apparatus is further configured to: carry out an angular scan by moving the X-ray detector and the first slit relative to the sample; and optionally combining the X-ray intensity values that have been assigned to the same detection angle but measured at different detection elements to generate an X-ray intensity-detection angle scan; or generate a plot representing the measured X-ray intensities corresponding to each calculated detection angle at each detection element; select a portion of the plot representing the sample; and generate an X-ray intensity-detection angle scan from the X-ray intensity data corresponding to the selected portion of the plot representing the sample.

The first slit may be part of a slit arrangement, wherein slit arrangement includes a second slit adjacent to the first slit and at a distance $L_2$ from the X-ray detector. In these embodiments, the detector may be configured to detect the plurality of X-rays passing through the first slit at a first region of the X-ray detector comprising the first detection element, and detect the plurality of X-rays passing through the second slit at a second region of the X-ray detector comprising a second detection element.

In these embodiments the processor may be configured to: for the first detection element, calculate the detection angle using the position of the first detection element relative to a first reference element; for the second detection element, calculate a second detection angle associated with an X-ray path of an X-ray from the sample through the second slit to the second detection element, wherein the calculation of the second detection angle uses the distance $L_2$ and the position of the second detection element relative to a second reference element; and assign a second X-ray intensity value measured at the second detection element to the second detection angle; wherein the first and second reference elements are the centre element of the X-ray detector, or the first reference element is the centre element of the X-ray detector, and the second reference element is in the second region of the X-ray detector.

In embodiments comprising two slits, the slit arrangement may further comprise a third slit positioned at a distance $L_3$ from the X-ray detector, wherein the first slit is positioned between the second slit and the third slit. In these embodiments, the detector may be configured to detect the plurality of X-rays passing through the third slit at a third region of the X-ray detector comprising a third detection element. In these embodiments, the processor may be configured to: calculate a third detection angle associated with an X-ray path of an X-ray from the sample through the third slit to the third detection element, wherein the calculation of the third detection angle uses the distance $L_3$ and the position of the third detection element relative to a third reference element; and assign a third X-ray intensity value measured at the third detection element to the third detection angle; wherein the first, second and third reference elements are all the centre element of the X-ray detector, or the first reference element is the centre element of the X-ray detector, the second reference element is in the second region of the X-ray detector and the third reference element is in the third region of the X-ray detector.

The apparatus may be configured to carry out an angular scan of the sample by moving the X-ray detector and the first slit and/or slit arrangement relative to the sample. In some of these embodiments, the processor may be configured to: determine a plurality of X-ray intensity profiles by, for each respective X-ray intensity profile, calculating a plurality of detection angles based on a respective estimated value of $L_1$; calculate the full width half maximum of a measurement peak of each intensity profile to determine the measurement resolutions of the intensity profiles; and select the intensity profile with the lowest measured value for full width half maximum.

The different X-ray intensity profiles may be calculated using different values for $L_1$. The measurement resolutions of the different intensity profiles can then be compared to determine the "true" value for $L_1$. The "true" value for $L_1$ may correspond to the value for $L_1$ that is associated with the highest resolution (the smallest value for the full width at half maximum). Accordingly, the intensity profile associated with the "true" value for $L_1$ may be selected/output.

In some other embodiments in which the apparatus is configured to carry out an angular scan of the sample by moving the X-ray detector and the first slit and/or slit arrangement relative to the sample, the processor may be configured to: accept an initial value of $L_1$ as an input; calculate a detection angle or multiple detection angles using the initial value of $L_1$; determine an intensity profile of X-ray intensity with respect to the or each calculated detection angle; measure the full width half maximum of a measurement peak of the intensity profile to determine the measurement resolution; repeat the steps of calculating a detection angle of multiple detection angles, determining an intensity profile and measuring the full width half maximum of a measurement peak of the intensity profile where the initial value of $L_1$ is replaced with an adjusted value of $L_1$ until the measurement resolution is below a resolution threshold. Alternatively, the steps may be repeated until the measurement resolution is determined to be above a resolution threshold (wherein measurement resolution above the resolution threshold represents high resolution).

In the above-described methods and apparatuses, the X-ray detector may be a one-dimensional X-ray detector (unless it is specified to be a two-dimensional X-ray detector).

According to a third aspect of the invention, there is a computer program product comprising instructions which, when the program is executed by a computer, cause the above-described apparatus to carry out the steps of the above-described method.

BRIEF DESCRIPTION OF THE DRAWINGS

Embodiments of the present invention will now be described, by way of example, with reference to the accompanying drawings, in which:

US 12,578,289 B2

13

Figure 1A:
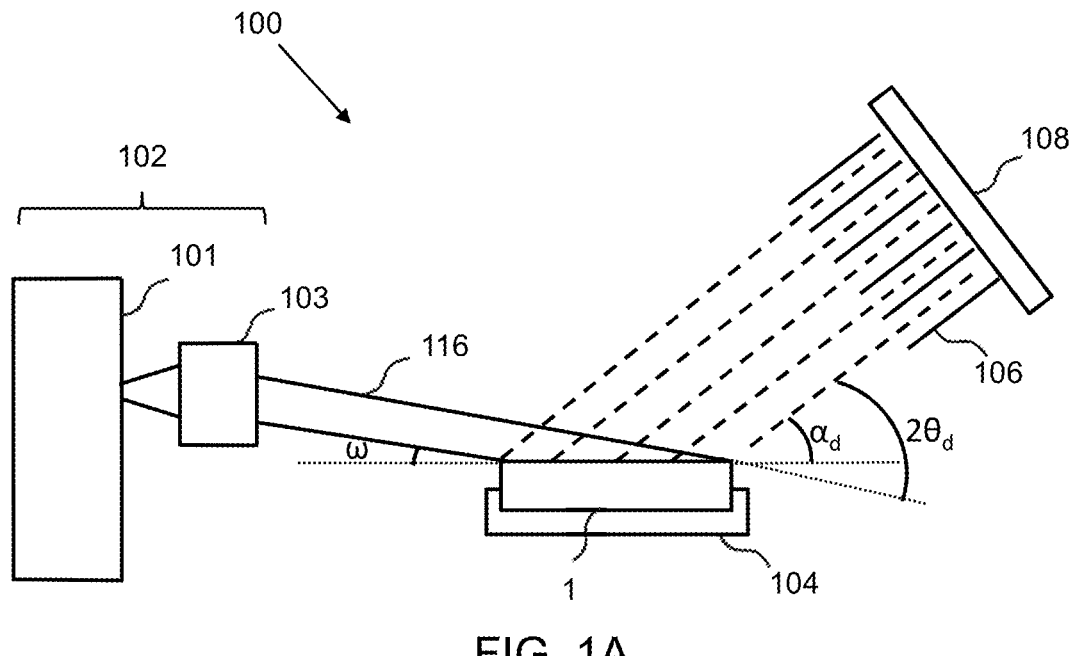
Figure 1B:
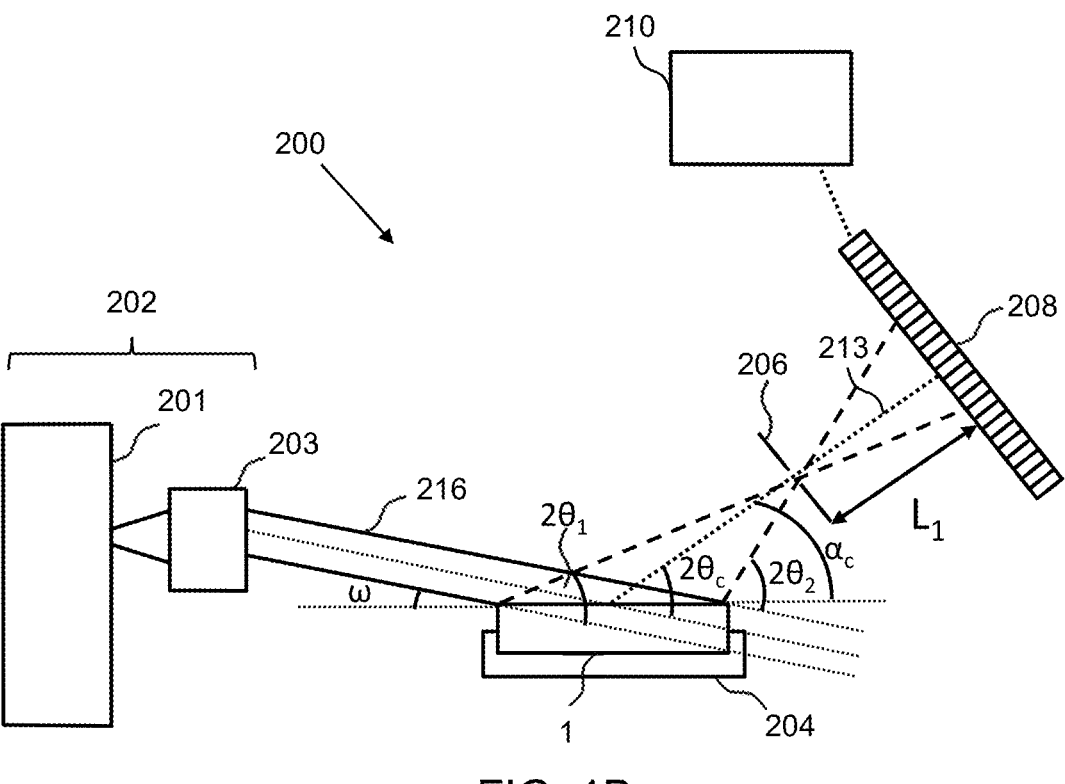
Figure 2:
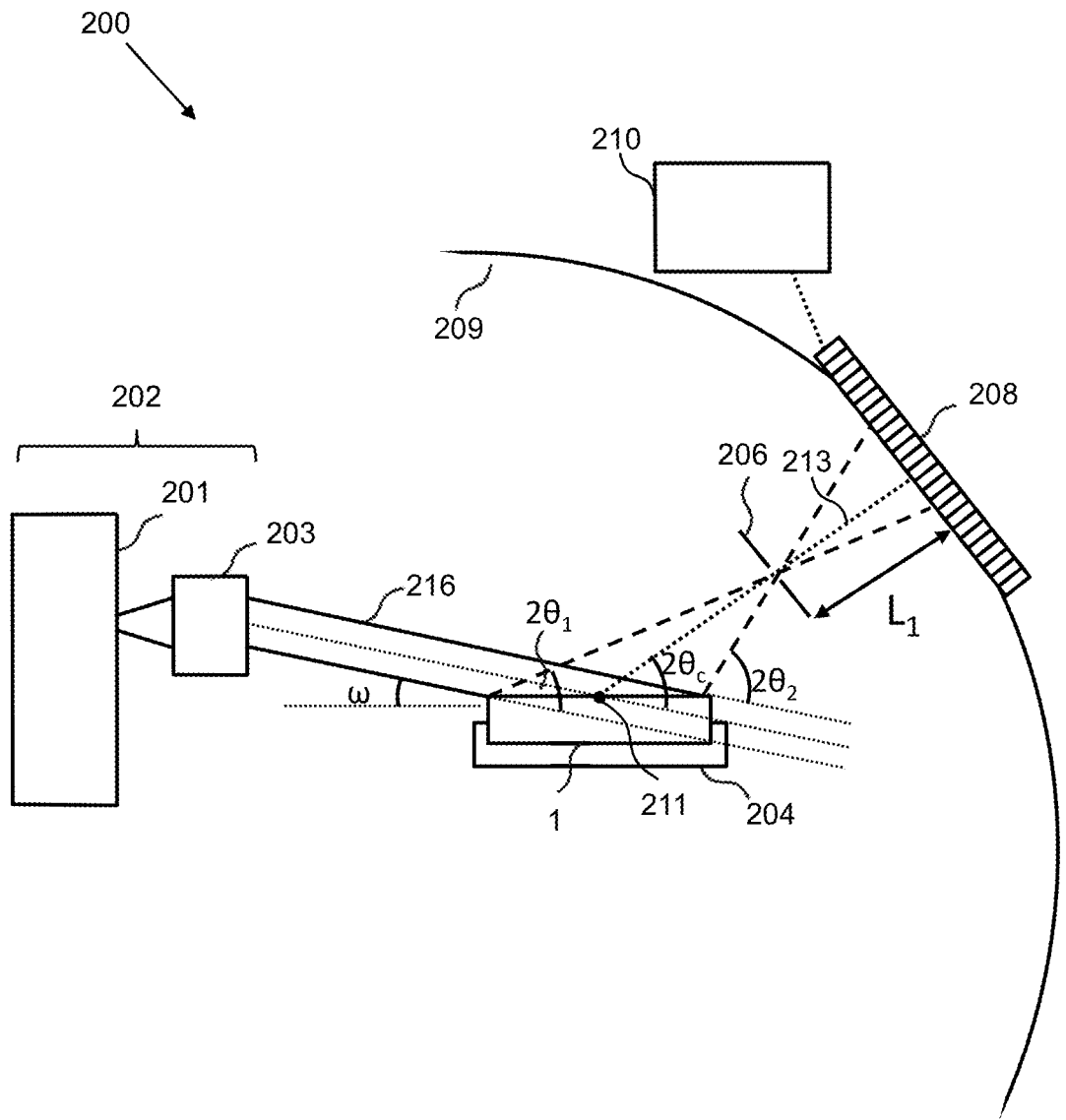
Figure 3:
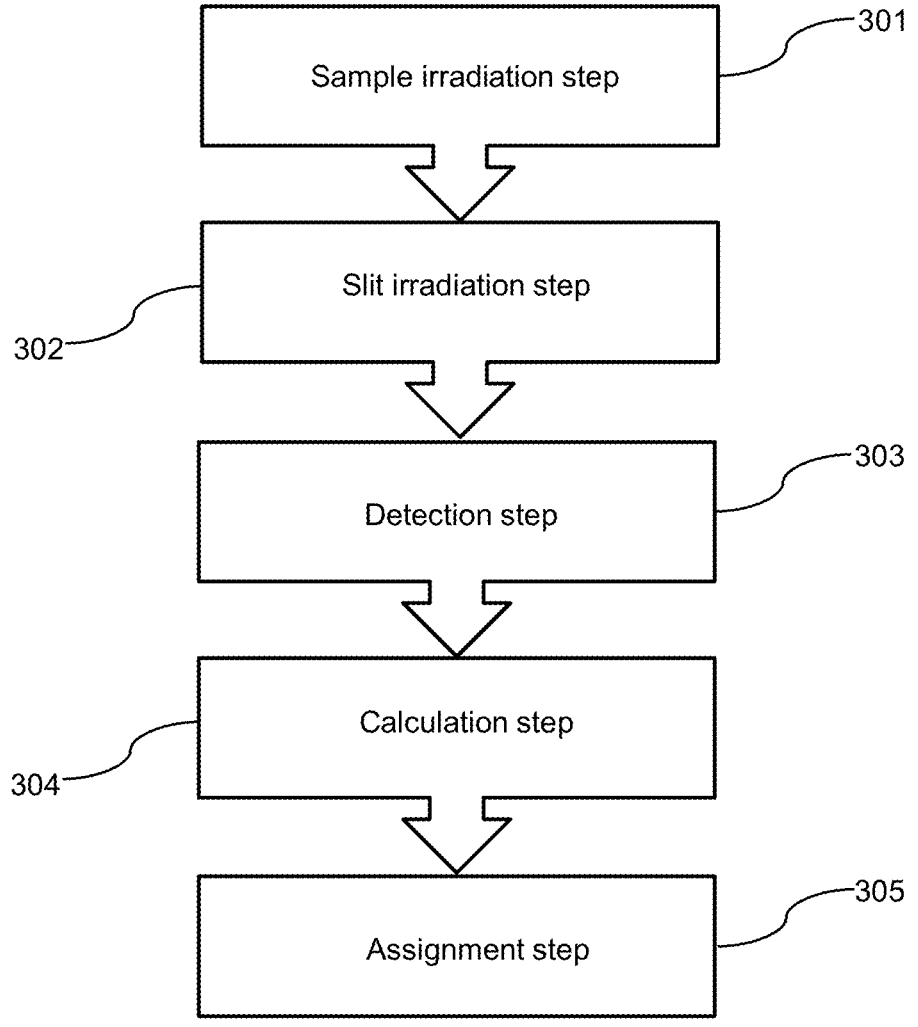
Figure 4:
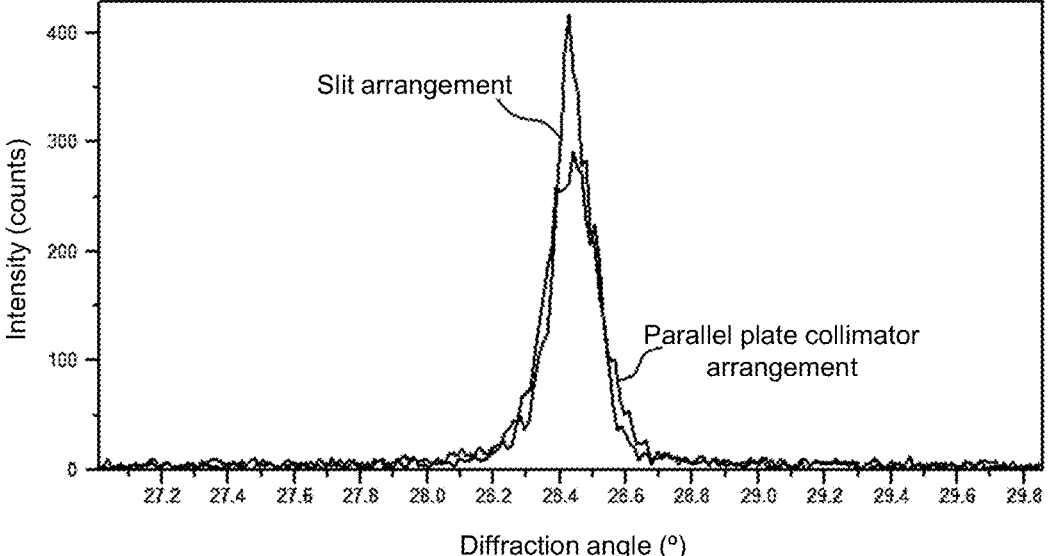
Figure 5A:
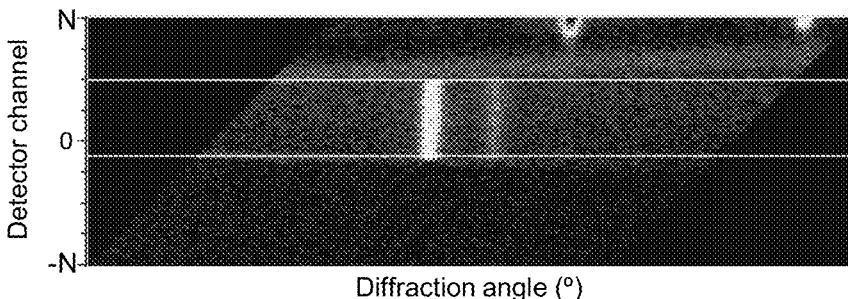
Figure 5B:
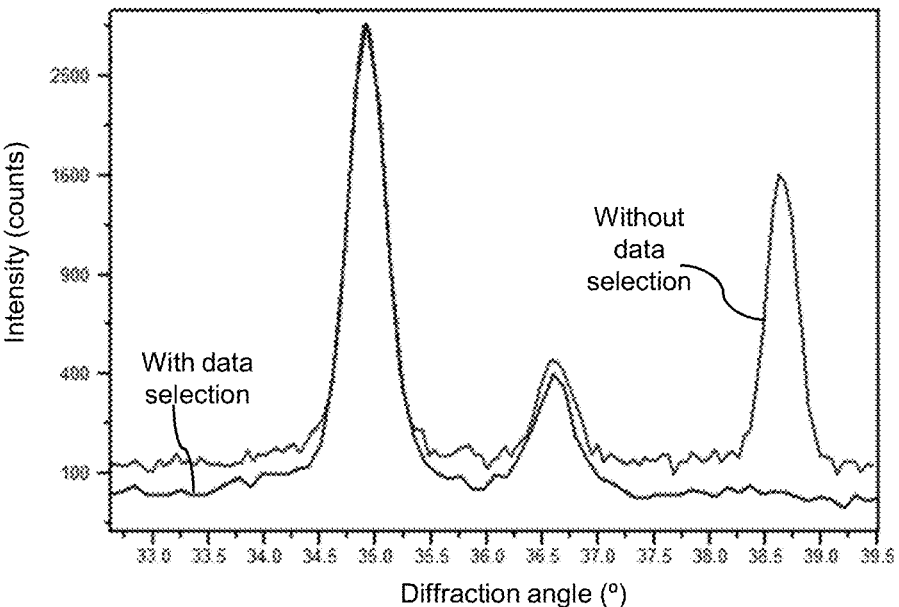
Figure 6:
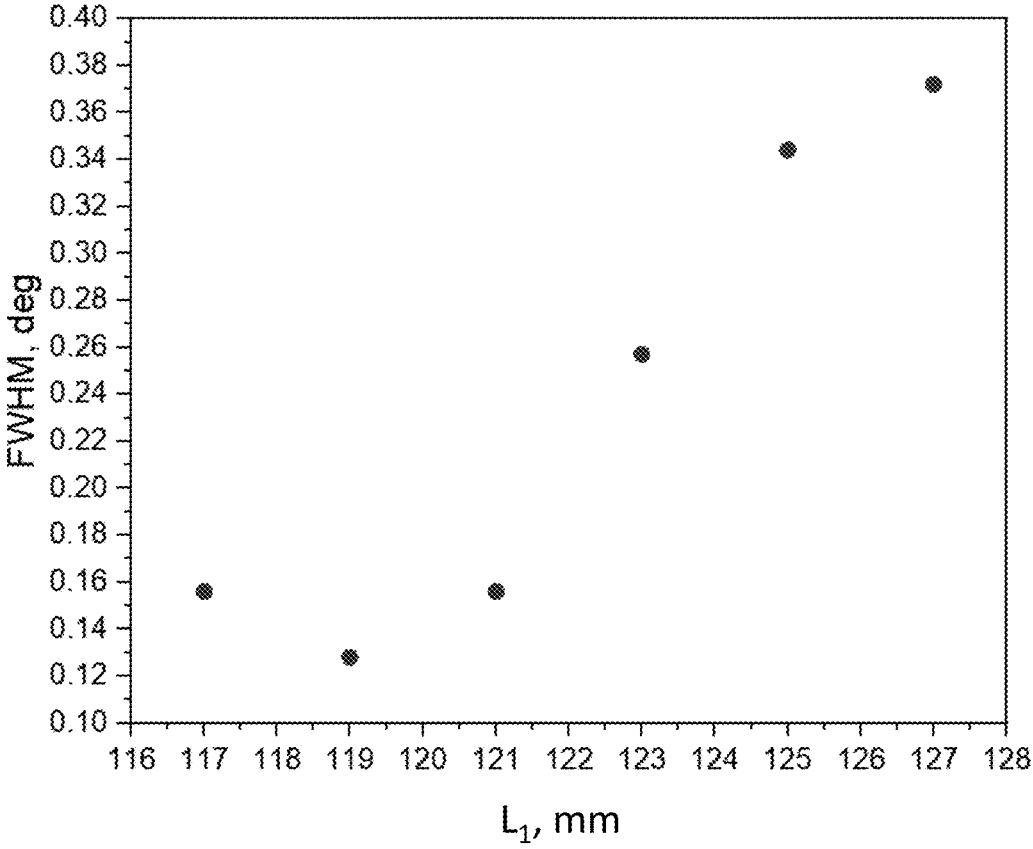
Figure 7:
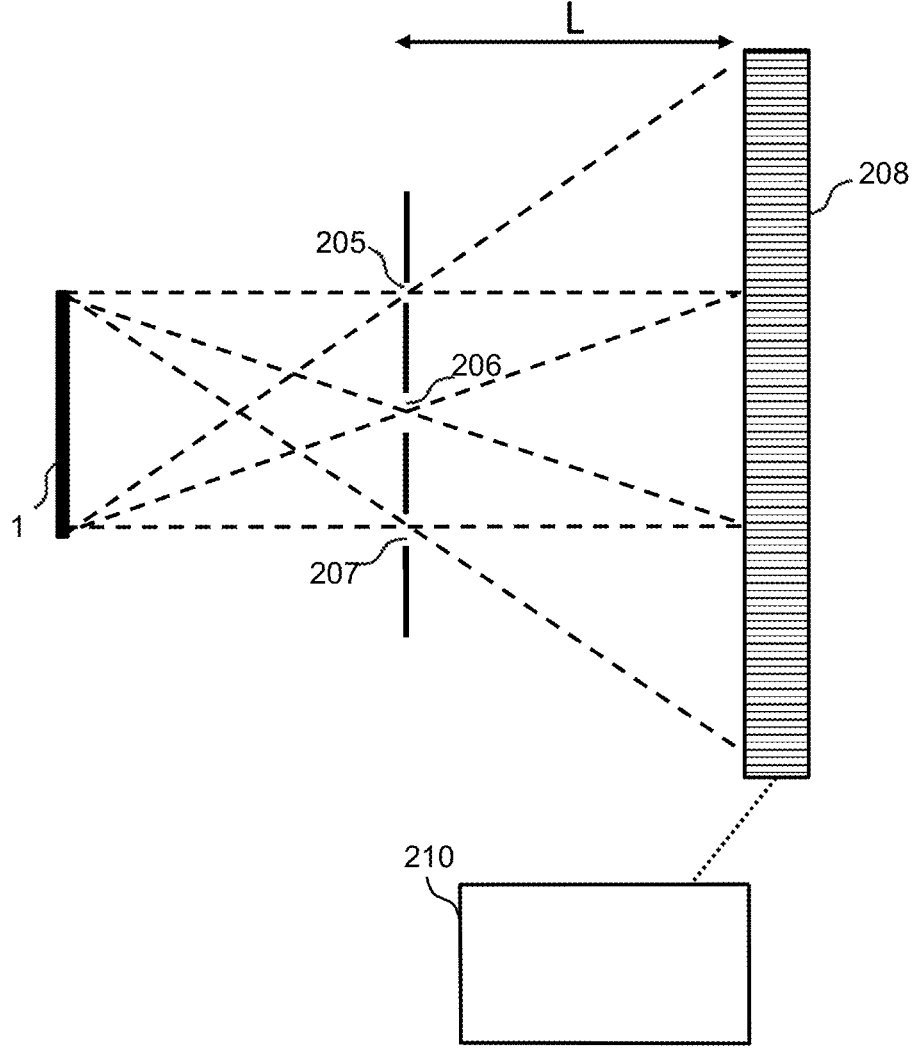
Figure 8:
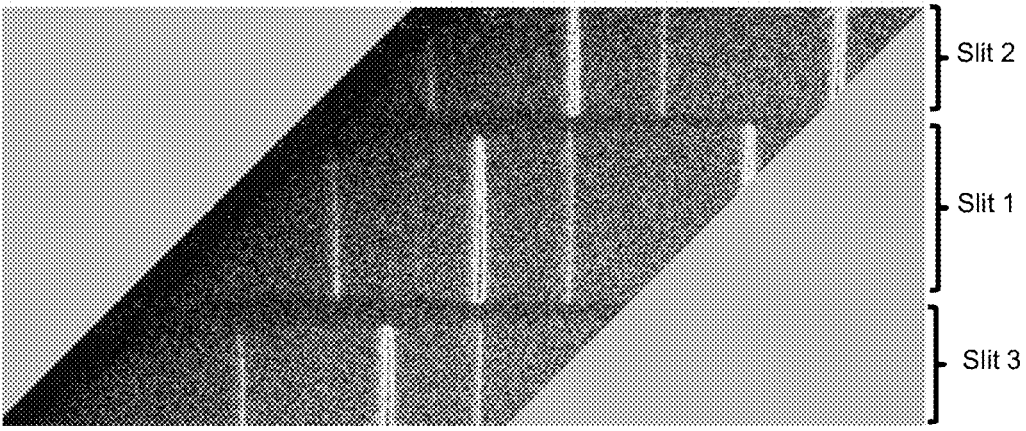
Figure 8:
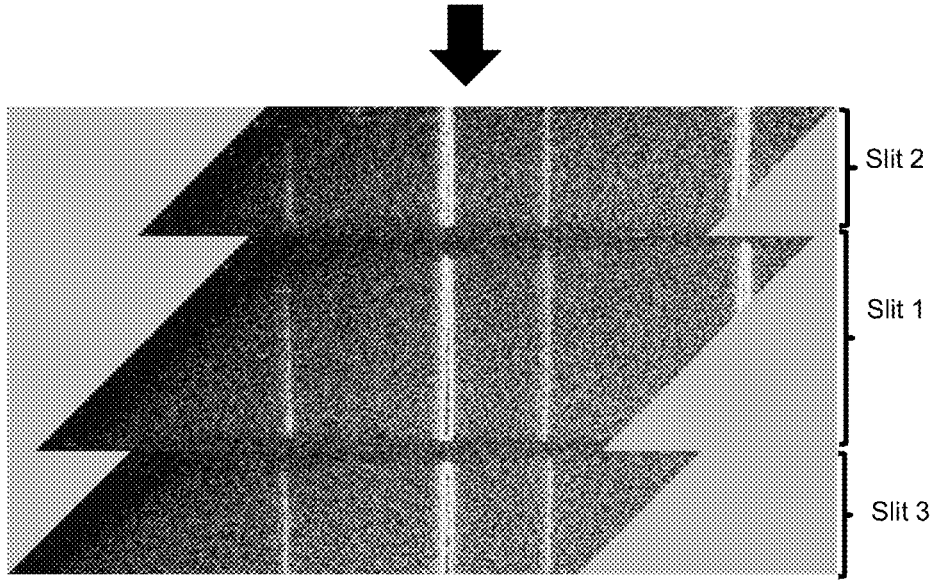
Figure 9:
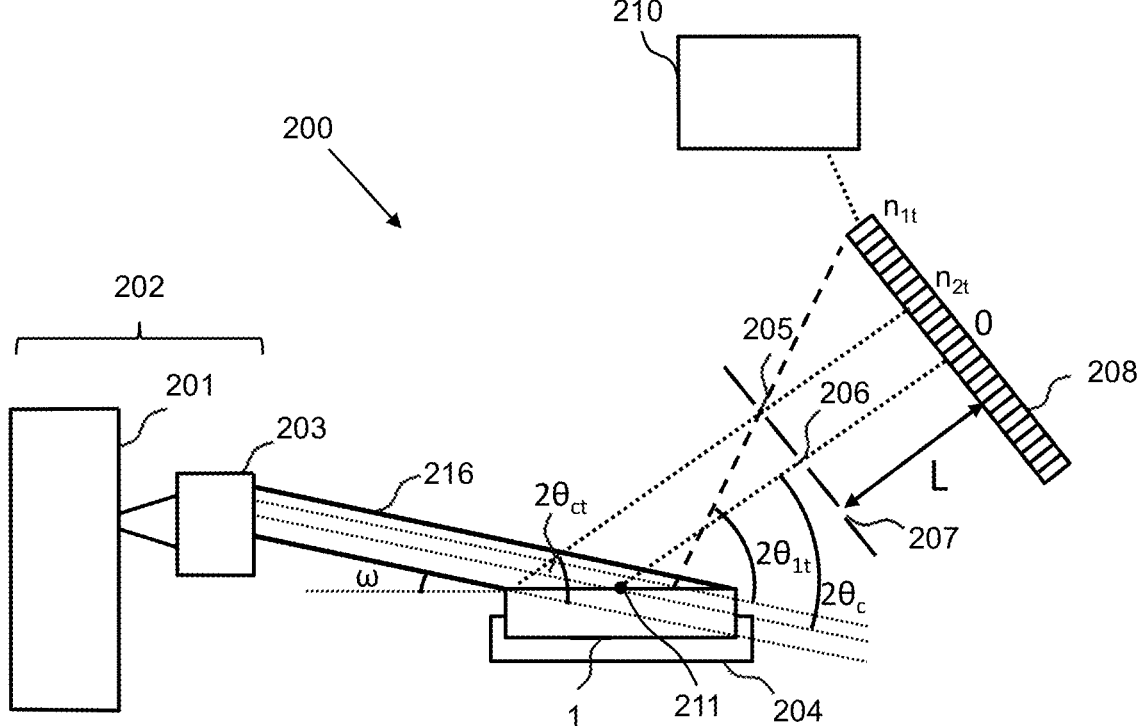

FIG. 1A is a schematic diagram illustrating an example of an X-ray analysis apparatus using parallel beam geometry, not according to an embodiment of the invention;

FIG. 1B is a schematic diagram illustrating an X-ray analysis apparatus, according to an embodiment of the invention;

FIG. 2 is a schematic diagram illustrating an X-ray diffraction apparatus, according to another embodiment of the invention;

FIG. 3 illustrates a method of X-ray analysis according to another embodiment of the invention;

FIG. 4 shows a comparison of an X-ray intensity profile obtained using a method according to an embodiment of the invention and an X-ray intensity profile obtained using an apparatus including a parallel plate collimator;

FIG. 5A shows experimental data measured according to another embodiment of the invention;

FIG. 5B shows example intensity-detection angle scan data collected according to the embodiment of the invention described in relation to FIG. 5A;

FIG. 6 shows experimental data collected according to another embodiment of the invention where the value of $L_1$ is determined;

FIG. 7 is a schematic diagram illustrating an X-ray apparatus comprising a slit arrangement including three slits;

FIG. 8 illustrates a method of processing data collected using the slit arrangement shown in FIG. 7; and FIG. 9 is a schematic diagram illustrating an X-ray apparatus comprising a slit arrangement including three slits, according to another embodiment of the invention.

It should be noted that these figures are diagrammatic and not drawn to scale. Relative dimensions and proportions of parts of these figures have been shown exaggerated or reduced in size, for the sake of clarity and convenience in the drawings.

DETAILED DESCRIPTION

FIG. 1A illustrates an example of an X-ray analysis apparatus 100 using parallel beam geometry. Typically, an X-ray analysis apparatus 100 for parallel beam geometry comprises an X-ray source 102, a sample stage 104, a parallel plate collimator 106 and a zero-dimensional (0D) X-ray detector 108. The X-ray source 102 generally comprises an X-ray tube 101 configured to generate a beam of X-rays and an X-ray optical element 103 configured to collimate the beam of X-rays from the X-ray tube 101 to provide a parallel beam of X-rays 116. FIG. 1A is an example of a comparative X-ray analysis apparatus, and does not represent an embodiment of the invention as claimed.

As shown in FIG. 1A, the detection angles ($2\theta_d$, $\alpha_d$) that can be measured using this comparative apparatus are determined by the position of the parallel plate collimator 106 relative to the sample. Typically, the apparatus includes a goniometer (not shown) for rotating the X-ray detector 108 together with parallel plate collimator 106 to adjust the angular position of the X-ray detector with respect to the sample.

The acceptance angle of the parallel plate collimator 106 is one of the main factors that determines the resolution of the X-ray analysis apparatus. The acceptance angle of a parallel plate collimator is fixed. Since it is inconvenient to replace the parallel plate collimator 106, and the user will typically only have access to a limited number of replacement parallel plate collimators, X-ray analysis apparatuses such as the one shown in FIG. 1A have limited functionality.

The inventors have realised that by providing a method of calculating detection angles using the distance $L_1$ between a slit and an X-ray detector comprising an array of detection elements it is possible to perform X-ray analysis using an apparatus with improved functionality compared to the apparatus shown in FIG. 1A. In particular, the inventors have recognised that by using this method it is possible to replace the parallel plate collimator 106 (and 0D X-ray detector) with a slit (and position-sensitive X-ray detector). Further, the inventors have realised that this means the X-ray apparatus is more cost-efficient, whilst being easier to align and the resolution easier to adjust.

FIG. 1B shows an X-ray analysis apparatus 200 for analysing a sample 1 according to an embodiment of the invention. The X-ray analysis apparatus 200 comprises an X-ray source 202, a sample stage 204, a first slit 206, an X-ray detector 208 comprising an array of detection elements, and a processor 210 configured to analyse data from the X-ray detector 208.

The inventors have realised that by using an X-ray detector 208 comprising an array of detection elements instead of the conventional 0D detector it becomes possible to use this new method of calculating detection angles. Each detection element of the X-ray detector 208 generates an X-ray intensity reading based on the X-rays incident on that detection element. The relative positions of each element of the X-ray detector are known. Thereby, it is possible to determine the position on the X-ray detector at which an X-ray is detected. That is, an X-ray detector 208 comprising an array of detection elements is position sensitive. The inventors have realised that by providing a position sensitive X-ray detector 208 in combination with a first slit 206 it is possible to calculate detection angles with this new method using the distance $L_1$ between the first slit 206 and the X-ray detector 208, and the position of the detector element where the X-ray is detected. In the embodiment shown in FIG. 1B, the X-ray detector 208 is a one-dimensional (1D) detector comprising a linear array of detection elements.

In FIG. 1B, the X-ray tube 201 is configured to generate a line focus of X-rays and the X-ray optical element 203 comprises a multilayer parabolic X-ray mirror. The multilayer parabolic X-ray mirror 203 is configured to receive X-rays from the X-ray tube 201 and to reflect a substantially parallel beam of X-rays 216 towards the sample 1 at an incident angle ω.

Referring to FIG. 1B, the X-ray analysis apparatus 200 is arranged so that the parallel beam of X-rays 216 irradiates the sample 1 arranged on the sample stage 204. X-rays incident on the sample 1 may be diffracted, reflected or scattered from the sample 1.

As shown in FIG. 1B, the first slit 206 is arranged between the sample 1 and the X-ray detector 208 at a distance of $L_1$ from the X-ray detector 208. The first slit 206 is positioned to receive X-rays from the sample 1 and to allow only a portion of the X-rays from the sample to pass through the first slit 206 towards the X-ray detector 208.

FIG. 1B also shows the processor 210 which is configured to receive data comprising X-ray intensities and information indicating at which elements of the X-ray detector 208 those X-rays were detected. The processor 210 is configured to calculate detection angles based on the distance $L_1$ between the first slit 206 and the X-ray detector 208, and the position of the first detector element.

In some embodiments, the apparatus may include a goniometer (not shown) for rotating the X-ray detector 208 together with the first slit 206 to adjust the angular position of the X-ray detector with respect to the sample. The X-ray source 202 may also be mounted to the goniometer, to facilitate adjustment of the incident angle ω. In some embodiments, the goniometer mounted to the X-ray source may facilitate continuous movement of the X-ray source to provide continuous adjustment of the incident angle ω.

The inventors have realised that the diffraction angles ($2\theta_1$, $2\theta_2$) may be calculated according to:

$$2\theta = 2\theta_c + \arctan\left(\frac{(\Delta n + 1)d}{L_1}\right) \tag{1}$$

where d is the pitch of the X-ray detector, Δn corresponds to the number of detection elements between the detection element and the reference element, and $2\theta_c$ is a reference angle between the parallel beam of incident X-rays from the X-ray source and the line between the centre of the goniometer 211 (in embodiments that include a goniometer) and the reference element. In embodiments that do not include a goniometer, $2\theta_c$ is an angle between the line perpendicular to an incident surface of the reference element passing through the first slit and the parallel beam of incident X-rays from the X-ray source. The line perpendicular to the incident surface of the reference element is shown as a dotted line 213 in FIG. 1B. The pitch, d, of the X-ray detector 208 is the distance between the centres of adjacent detection elements of the X-ray detector 208. As shown in FIG. 1B, the X-ray detector 208 is aligned so that the surface of the X-ray detector 208 where the X-rays are detected is substantially perpendicular to the line between the centre of goniometer and the reference element, and the reference element of the X-ray detector 208 is directly opposite the first slit 206 at a substantially perpendicular distance of $L_1$ from a centre of the first slit 206. The reference element may be the centre element of the X-ray detector 208. It will be understood by the skilled person that detection angles from reflected or scattered X-rays can also be calculated using equation 1. The inventors realised that, by calculating the detection angles in this way, an X-ray analysis apparatus comprising a slit 206 and a position sensitive X-ray detector instead of a parallel plate collimator 106 and 0D X-ray detector can be used, providing a system with improved functionality.

Using alternative notation, the diffraction angles ($2\theta_1$, $2\theta_2$) may be calculated according to:

$$2\theta = 2\theta_c + \arctan\left(\frac{nd}{L_1}\right) \tag{2}$$

where d is the pitch of the X-ray detector, n is a detection element index, wherein the reference element corresponds to n=0, and $2\theta_c$ is a reference angle between the parallel beam of incident X-rays from the X-ray source and the line between the centre of the goniometer 211 (in embodiments that include a goniometer) and the reference element. In embodiments that do not include a goniometer, $2\theta_c$ is an angle between the line perpendicular to an incident surface of the reference element and the parallel beam of incident X-rays from the X-ray source.

Alternatively, in cases where the surface of the sample is substantially even, the detection angles ($\alpha_1$, $\alpha_2$) may be calculated according to:

$$\alpha = \alpha_c + \arctan\left(\frac{(\Delta n + 1)d}{L_1}\right) \tag{3}$$

where d is the pitch of the X-ray detector, Δn corresponds to the number of detection elements between the detection element and the reference element, and $\alpha_c$ is an angle between the surface of the sample and the line between the centre of the goniometer 211 (in embodiments that include a goniometer) and the reference element. In embodiments that do not include a goniometer, $\alpha_c$ is an angle between the line perpendicular to an incident surface of the reference element and the surface of the sample. The first slit is aligned to be on this line.

Using alternative notation, in cases where the surface of the sample is substantially even, the detection angles ($\alpha_1$, $\alpha_2$) may be calculated according to:

$$\alpha = \alpha_c + \arctan\left(\frac{nd}{L_1}\right) \tag{4}$$

where d is the pitch of the X-ray detector, n is a detection element index, wherein the reference element corresponds to n=0, and $\alpha_c$ is an angle between the surface of the sample and the line between the centre of the goniometer 211 (in embodiments that include a goniometer) and the reference element. In embodiments that do not include a goniometer, $\alpha_c$ is an angle between the line perpendicular to an incident surface of the reference element and the surface of the sample.

The relationship between the angles α and 2θ is:

$$2\theta = \alpha + \omega \tag{5}$$

where ω is the incident angle of the X-ray beam. In embodiments including a goniometer, ω is the acute angle between the incident beam of X-rays and the reference plane of the goniometer-whether or not the surface of the sample is substantially even. The skilled person will understand that the apparatus can be arranged such that the angles α and ω can be measured relative to a reference plane defined with respect to the goniometer. In some embodiments, this reference plane may be parallel to the surface of the sample.

FIG. 2 shows an X-ray diffraction analysis apparatus 200 for analysing a sample 1. FIG. 2 illustrates how X-rays diffracted from different points on the sample 1, and having different angles of diffraction, can pass through the first slit 206 and be detected on the X-ray detector 208. The diffraction angles ($2\theta_1$, $2\theta_2$) represent the angle between the respective X-ray path and the parallel incident beam.

As illustrated in FIG. 2, multiple diffraction angles ($2\theta_1$, $2\theta_2$) can be collected at a single X-ray detector position. The processor 210 is configured to calculate each diffraction angle ($2\theta_1$, $2\theta_2$). In FIG. 2, the line perpendicular to an incident surface of the reference element and passing though the centre of the goniometer (211) is shown as a dotted line 213.

In some embodiments, the position of the X-ray detector can be changed to carry out an angular scan. The arrangement in FIG. 2 includes a goniometer (not shown) for rotating the X-ray detector 208 together with the first slit 206. In FIG. 2, part of the path 209 that the X-ray detector 208 and the first slit 206 can take when rotated is illustrated. An axis of the goniometer, about which the X-ray detector 208 together with the first slit 206 rotates, passes through the centre of the goniometer 211 and extends into the plane of the page. Using this arrangement, at a first position of the X-ray detector 208 and first slit 206, the plurality of X-rays pass through the first slit and are detected at the X-ray detector 208. For at least a first detection element of the array of detection elements, the processor 210 is configured to calculate a diffraction angle associated with an X-ray path of an X-ray from the sample 1 that passes through the first slit 206 to the first detection element. The processor 210 is configured to assign an X-ray intensity value measured at the first detection element to the calculated diffraction angle.

The X-ray detector 208 and first slit 206 can then be rotated to a second position using the goniometer. The plurality of X-rays that pass through the first slit 206 when the X-ray detector 208 and first slit 206 are at this second position are detected at the X-ray detector 208. For at least one detection element of the array of detection elements, the processor 210 is configured to calculate a diffraction angle associated with an X-ray path of an X-ray from the sample 1 that passes through the first slit 206 to the first detection element. The detection element used here may be the same element or a different element from the first detection element used at the previous X-ray detector 208 and slit 206 position. The processor 210 is configured to assign an X-ray intensity value measured at the detection element to the diffraction angle.

This process can be repeated for as many positions of the X-ray detector 208 and first slit 206 as desired. At each position, X-rays with different diffraction angles may pass through the first slit 206 and be detected at different detector elements of the X-ray detector 208. At each position of the X-ray detector 208 and first slit 206, the processor 210 is configured to calculate at least one diffraction angle associated with a detector element (i.e. one diffraction angle, for one detection element, or multiple diffractions angles—one for each respective detection element).

The processor 210 may also be configured to calculate multiple diffraction angles (for corresponding detection elements) at each rotational position. In particular, at each position of the X-ray detector 208 and first slit 206 the X-ray detector 208 may be configured to detect an X-ray at each detection element. In these embodiments, the processor 210 may be configured to calculate a diffraction angle for each detection element of the X-ray detector 208 using the position of each respective detection element and the distance $L_1$. The processor 210 may also be configured to assign an X-ray intensity measured at each detection element to the corresponding diffraction angle.

X-rays with the same angle of diffraction may be measured when the X-ray detector 208 and first slit 206 are at different positions, just for different regions of the sample surface. The processor may be configured to combine X-ray intensity measurements associated with the same angle of diffraction obtained at different positions of the X-ray detector 208 and first slit 206—e.g. by summing or averaging.

Referring to FIG. 3, according to an embodiment of the invention there is provided a method of X-ray analysis for analysing a sample. The method may be carried out using an X-ray apparatus as described in connection with FIGS. 1B and 2.

In an embodiment, the method comprises, in a sample irradiation step 301, using an X-ray source to irradiate a surface of the sample 1 with a parallel beam of incident X-rays.

In a slit irradiation step 302, a plurality of X-rays from the sample are passed through a first slit 206, towards an X-ray detector 208 comprising an array of detection elements, wherein the first slit 206 is positioned at a distance $L_1$ from the X-ray detector 208. Typically the apparatus is calibrated so that the distance $L_1$ is known.

In a detection step 303, the plurality of X-rays from the sample 1 are detected at the X-ray detector 208.

In a calculation step 304, the method comprises for a first detection element of the array of detection elements, calculating a diffraction angle associated with an X-ray path of an X-ray from the sample 1 that passes through the first slit 206 to the first detection element. The calculation of the diffraction angle uses the distance $L_1$ and the position of the first detection element.

In an assignment step 305, an X-ray intensity value measured at the first detection element is assigned to the detection angle determined in the calculation step 304.

The diffraction angles $(2\theta)$ may be calculated according to:

$$2\theta = 2\theta_c + \arctan\left(\frac{(\Delta n + 1)d}{L_1}\right) \tag{1}$$

where d is the pitch of the X-ray detector 208, $\Delta$n corresponds to the number of detection elements between the detection element and the reference element, $2\theta_c$ is a reference angle between the parallel beam of incident X-rays from the X-ray source and the line between the centre of the goniometer 211 and the reference element. In embodiments that do not include a goniometer, $2\theta_c$ is a reference angle between the line perpendicular to an incident surface of the reference element and the parallel beam of incident X-rays from the X-ray source. The pitch, d, of the X-ray detector 208 is the distance between the centres of adjacent detection elements of the X-ray detector. The X-ray detector 208 is aligned so that the surface of the X-ray detector 208 where the X-rays are detected is substantially perpendicular to the line between the centre of the goniometer 211 and the reference element, and a reference element of the X-ray detector 208 is directly opposite the first slit 206 at a substantially perpendicular distance of $L_1$ from a centre of the first slit 206. The reference element may be the centre element of the X-ray detector 208. The first slit is aligned to be on the line between the reference element and the centre of the goniometer.

Alternatively, in cases where the surface of the sample is substantially even, the detection angles (a) may be calculated according to:

$$\alpha = \alpha_c + \arctan\left(\frac{(\Delta n + 1)d}{L_1}\right) \tag{3}$$

where d is the pitch of the X-ray detector, $\Delta$n corresponds to the number of detection elements between the detection element and the reference element, and a is an angle between the surface of the sample and the line between the centre of the goniometer 211 (in embodiments that include a goniometer) and the reference element. In embodiments that do not include a goniometer, $\alpha_c$ is an angle between the line perpendicular to an incident surface of the reference element and the surface of the sample.

The detection angles ($\alpha$, 2$\theta$) may be calculated using the approximated formulas:

$$\alpha = \alpha_c + (\Delta n + 1) \cdot \arctan\left(\frac{d}{L_1}\right) \tag{6}$$

$$2\theta = 2\theta_c + (\Delta n + 1) \cdot \arctan\left(\frac{d}{L_1}\right) \tag{7}$$

The skilled person will understand that, in some embodiments, the processor can be configured to calculate the detection angles using the notation used at equations 2 and 4 instead.

The inventors have realised that by providing a method whereby the detection angle is calculated using the distance $L_1$ it is possible to use an X-ray apparatus (such as that shown in FIGS. 1B and 2) comprising a slit 206 instead of a parallel plate collimator 106 between the X-ray detector 208 and sample 1. In particular, it is possible to perform X-ray analysis using a system that is cost-effective and easier to align, whilst still achieving high quality results. Another advantage of using an X-ray apparatus (such as that shown in FIGS. 1B and 2) comprising a slit is that multiple detection angles can be detected at each position of the X-ray detector 208 and first slit 206—whereas X-rays corresponding to only one detection angle will be detected using an arrangement comprising a parallel plate collimator at each position of the collimator relative to the sample. Performing an angular scan by moving the X-ray detector 208 and first slit 206 relative to the sample 1 may enable detection of X-rays travelling towards the X-ray detector 208 over a wider range of detection angles. By summing the X-ray intensities of X-rays corresponding to the same angle of detection detected at different positions of the X-ray detector 208 and first slit 206, it is possible to obtain measurements with intensities similar to, if not better than, those made using a parallel plate collimator. Further, by using parallel beam geometry, the measurements are not sensitive to either the height or thickness of the sample.

In an embodiment, the method shown at FIG. 3 can be used to make grazing incidence X-ray analysis measurements. In this embodiment, the sample irradiation step 301 involves using the X-ray source 202 to irradiate a surface of the sample at a fixed grazing incidence angle. Typically, grazing incidence angles are nearly parallel to the surface of the sample 1 so that penetration of the X-ray into the sample is limited. That is, the acute angle $\omega$ between the incident beam of X-rays and the surface of the sample may be equal to or less than 3°, and preferably equal to or less than 1.5°.

In embodiments involving grazing incident X-ray analysis measurements, an angular scan is performed by moving the X-ray detector 208 and the first slit 206 relative to the sample while the beam of incident X-rays irradiates the sample at the fixed grazing incidence angle. That is, each of steps 301-305 are performed at multiple positions of the X-ray detector 208 and first slit 206. The X-ray detector 208 and first slit 206 may be moved using a goniometer.

In some embodiments where the method shown at FIG. 3 is used to make grazing incidence X-ray analysis measurements, at each position of the X-ray detector 208 and first slit 206, multiple diffraction angles may be calculated. In particular, at each position of the X-ray detector 208 and first slit 206 the X-ray detector 208 may be configured to detect a diffracted X-ray at each detector element. In these embodiments, the processor 210 may be configured to calculate a diffraction angle for each detection element of the X-ray detector 208 using the position of each respective detection element and the distance $L_1$. The processor 210 may also be configured to assign an X-ray intensity measured at each detection element to the corresponding diffraction angle.

The method shown at FIG. 3 can be used to make in-plane or out-of-plane grazing incidence X-ray diffraction measurements.

In an embodiment, the method shown at FIG. 3 further comprises a step of making an X-ray reflectometry measurement. The inventors have realised that the X-ray apparatus shown in FIGS. 1B and 2 can be used for both X-ray diffraction and X-ray reflectometry measurements. That is, a user can carry out the method of FIG. 3 to determine X-ray diffraction angles. It is then possible for the user to use the same apparatus to make an X-ray reflectometry measurement (by using the slit, and the central channel of the position sensitive X-ray detector). That is, by providing a method whereby the diffraction angle is calculated using the distance $L_1$, the inventors have realised that it is possible to use an X-ray analysis apparatus comprising a slit 206 which achieves high quality measurements for both GIXRD and XRR with minimal reconfiguration.

FIG. 4 shows a plot of X-ray intensity with respect to diffraction angle using the X-ray analysis apparatus 200 according to an embodiment of the invention and a plot of X-ray intensity with respect to diffraction angle using a parallel beam arrangement including a parallel plate collimator. The same measurement time was used to collect the data for both plots. The results show that similar, if not improved, resolution and X-ray intensity can be obtained using the X-ray apparatus where the parallel plate collimator 106 has been replaced with the slit 206, and a method of calculating the diffracted angles using the distance $L_1$ performed. The skilled person will understand the full width half maximum (FWHM) of an intensity peak can be used as a measure of resolution.

In embodiments involving carrying out an angular scan to measure multiple diffraction angles for each detection element, the method of X-ray analysis may comprise the additional step of generating a plot representing the measured X-ray intensities corresponding to each calculated diffraction angle at each detection element. FIG. 5A shows a plot representing the measured X-ray intensities corresponding to each calculated diffraction angle at each detection element, where the x-axis is the angle of diffraction, the y-axis corresponds to the detector channel at which the X-rays are detected, and the pixel values represent the measured X-ray intensities. This plot is obtained by recording the X-ray intensities detected at each detector channel over an angular scan. This method may comprise the additional steps of selecting a portion of the plot representing the sample 1 (this portion is within the horizontal white lines in FIG. 5A) and generating an X-ray intensity-detection angle scan from the X-ray intensity data corresponding to the selected portion of the plot representing the sample 1.

The inventors have realised that by using this image of the sample 1 they can select a portion of the data that represents X-rays diffracted from the sample, rather than background signal (e.g. signal from a region of substrate surrounding the sample). By generating an X-ray intensity-detection angle scan from only the data within the selected portion, the inventors are able to remove background contributions to the signal and thereby generate a more useful X-ray intensity-detection angle scan. FIG. 5B shows the difference between obtaining an intensity-detection angle scan with and without data selection.

Generally, the value of $L_1$ is known in advance. However, the inventors have realised that it may be convenient to determine the value of $L_1$ using measurement data from angular scans of the sample, where a different value of $L_1$ is used as an input to the processor before each angular scan is performed. FIG. 6 shows a plot of FWHM with respect to $L_1$. The results show that there is a value of $L_1$ that provides the lowest FWHM values, and thereby the best resolution.

Alternatively, in embodiments where an image of the sample such as that shown in FIG. 5A is obtained, the inventors have realised that this calibration procedure can be performed during post-processing of the obtained data to choose the value of the $L_1$ that will give the optimal results. This can be useful if the X-ray apparatus is modified post-factory calibration, for example.

In some embodiments involving this post-processing procedure a plurality of X-ray intensity profiles is determined by, for each respective X-ray intensity profile, calculating a plurality of detection angles based on a respective estimated value of $L_1$. The full width half maximum of a measurement peak is measurement for each intensity profile to determine the measurement resolutions of the intensity profiles. The intensity profile with the lowest measured value for full width half maximum corresponds to the value of $L_1$ that is considered to give optimal results. This value can be considered the "true" value for $L_1$ and may be used as the calibrated value of $L_1$ in subsequent X-ray analysis procedures.

In some other embodiments involving this post-processing procedure, an initial value of $L_1$ is set. Each detection angle is then calculated using this initial value of $L_1$ in order to determine an intensity profile of X-ray intensity with respect to calculated detection angle. The FWHM of a measurement peak of the intensity profile may be measured to determine the measurement resolution. The calculation and resolution measurement steps may be repeated, where the initial value of $L_1$ is replaced with an adjusted value of $L_1$ until the measurement resolution is below a resolution threshold. The final value of $L_1$ is the value that provides the best measurement resolution.

FIG. 7 shows an example comprising a slit arrangement arranged between the sample 1 and the X-ray detector 208, wherein the slit arrangement comprises three parallel slits. In the apparatus shown at FIG. 7, each of the slits has the same slit width and is positioned at the same distance L from the X-ray detector 208. The inventors have realised that by using multiple slits, it is possible to create multiple non-overlapping images of the sample on the X-ray detector. In this way, a greater extent of the X-ray detector 208 length can be used. In this embodiment, the processor 210 is configured to analyze the three detector sections separately and convert them into one scan. The calculation step 304 involves selecting a reference element for each slit. The first, second and third reference elements, corresponding to the first slit 206, second slit 205 and third slit 207 respectively, may all be the centre element of the X-ray detector 208. Alternatively, the first reference element is the centre element of the X-ray detector 208, the second reference element is in the second region of the X-ray detector 208 and the third reference element is in the third region of the X-ray detector 208. The second reference element may be the detector element positioned directly opposite the centre of the second slit 205. Likewise, the third reference element may be the detector element positioned directly opposite the centre of the third slit 207.

FIG. 8 shows intensity-detection angle data collected from each of the three slits shown in FIG. 7. In the case where the first, second and third reference elements are all centre element of the X-ray detector 208, the data from each slit can be shifted as illustrated in FIG. 8 before calculation of the diffraction angles is performed.

In an alternative embodiment, the distance between the respective reference elements is incorporated into the formula used to calculate the detection angles. FIG. 9 shows an example comprising a slit arrangement arranged between the sample 1 and the X-ray detector 208, wherein the slit arrangement comprises three parallel slits. For example, as shown in FIG. 9, the diffraction angle $2\theta_{1t}$ corresponding to an X-ray passing through a second slit 205 and being detected at a detector element with the detection element index nit may be calculated according to:

$$2\theta_{1t} = 2\theta_c + \arctan\left(\frac{(n_{1t} - n_{2t}) * d}{L}\right) \tag{8}$$

where d is the pitch of the X-ray detector 208, $n_{2r}$ is the detection element index of the second reference element, wherein the first reference element corresponds to n=0, and $2\theta_c$ is a reference angle between the parallel beam of incident X-rays from the X-ray source and the line between the centre of the goniometer 211 (in embodiments that include a goniometer) and the first reference element. In embodiments that do not include a goniometer, $2\theta_c$ is a reference angle between the line perpendicular to an incident surface of the first reference element and the parallel beam of incident X-rays from the X-ray source. The pitch, d, of the X-ray detector 208 is the distance between the centres of adjacent detection elements of the X-ray detector. The X-ray detector 208 is aligned so that the surface of the X-ray detector 208 where the X-rays are detected is substantially perpendicular to the line between the centre of the goniometer 211 and the first reference element, and a first reference element of the X-ray detector 208 is directly opposite the first slit 206 at a substantially perpendicular distance of L from a centre of the first slit 206. The first reference element may be the centre element of the X-ray detector 208.

Referring to FIG. 9, $2\theta_{ct}$ is a reference angle between the line perpendicular to an incident surface of the second reference element and the parallel beam of incident X-rays from the X-ray source. In cases where the first and second reference element are separated by the same distance as the first and second slits, then $2\theta_{ct}$ is equal to $2\theta_c$.

In cases where the surface of the sample is substantially even, the detection angle $\alpha_{1t}$ corresponding to an X-ray passing through a second slit 205 and being detected at a detector element with the detection element index nit may be calculated according to:

$$\alpha_{1t} = \alpha_c + \arctan\left(\frac{(n_{1t} - n_{2t}) * d}{L}\right) \tag{9}$$

where d is the pitch of the X-ray detector 208, net is the detection element index of the second reference element, wherein the first reference element corresponds to n=0, and $\alpha_c$ is a reference angle between the surface of the sample and the line between the centre of the goniometer 211 (in embodiments that include a goniometer) and the first reference element. In embodiments that do not include a goniometer, a is a reference angle between the line perpendicular to an incident surface of the first reference element and the surface of the sample.

It will be appreciated that modifications can be made to the above-described examples without departing from the scope of the claims.

In particular, any formula that can be used to calculate the detection angles using the distance $L_1$ and the position of the relevant detection elements can be used without departing from the invention.

In some embodiments, the axial divergence of the parallel beam of X-rays incident on the sample is controlled using Soller slits. Divergence of the incident beam can also be controlled using a divergence slit.

In some embodiments, the axial width of the parallel beam of X-rays 216 can be controlled using beam masks.

In some embodiments, an alternative X-ray optic can be used to form a parallel beam. For example, instead of the optical element 203 comprising a multilayer parabolic X-ray mirror, the optical element 203 may comprise an X-ray lens (e.g. a polycapillary lens). The X-ray lens may include many glass capillaries with diameters on the micrometre scale (for example, each capillary having an approximate diameter of 5 μm). The capillaries may be arranged in a shape to produce an essentially parallel X-ray beam. Using Soller slits as the X-ray optic, a beam divergence of approximately 0.5° is obtainable. When the X-ray optic is a X-ray lens, divergences of approximately 0.4° are achievable. When the X-ray optic is a parabolic multi-layer mirror, divergences of approximately 0.04° are achievable. For the purposes of X-ray analysis, a divergence of less than 0.5 degrees is considered substantially parallel.

In some embodiments, a two-dimensional detector array can be used instead of a 1D detector array as the X-ray detector 208.

In some embodiments, the processor 210 may be integral with the X-ray detector 208.

In some embodiments, the X-ray analysis apparatus 200 may be arranged in transmission geometry rather than in reflection geometry. That is, the X-ray detector 208 and first slit 206 may be arranged on the opposite side of the sample 1 in comparison to the arrangements shown in FIG. 1B or FIG. 2 (which show reflection geometry).

In some embodiments, the method illustrated in FIG. 3 can be used to carry out in-plane X-ray diffraction or residual stress analysis. The method illustrated in FIG. 3 is suitable for either transmission or reflection geometry. In some embodiments, the analysis of samples with uneven (or rough) surfaces can be carried out.

In some embodiments involving a slit arrangement with multiple slits, each slit may have the same width. Alternatively, one or more slits may have different widths.

In some embodiments involving a slit arrangement with multiple slits, each slit may be positioned at the same distance from the detector. That is, $L_1$, $L_2$ and $L_3$ may all be equal. Alternatively, one or more slits may be positioned at different distances from the detector.

The slit arrangement is not limited to comprising a maximum of three slits, the slit arrangement may comprise any number of slits.

What is claimed is:

1. A method of X-ray analysis for analysing a sample, the method comprising:

using an X-ray source to irradiate a surface of the sample with a parallel beam of incident X-rays;

passing a plurality of X-rays from the sample through a first slit, towards an X-ray detector comprising an array of detection elements, wherein the first slit is positioned at a distance $L_1$ from the X-ray detector;

detecting the plurality of X-rays from the sample at the X-ray detector; and for a first detection element of the array of detection elements, calculating a detection angle associated with an X-ray path of an X-ray from the sample that passes through the first slit to the first detection element, wherein the calculation of the detection angle uses the distance $L_1$ and the position of the first detection element in the array of detection elements;

the method further comprising assigning an X-ray intensity value measured at the first detection element to the detection angle.

2. The method of claim 1, further comprising:

calculating, for each of a plurality of detection elements of the array of detection elements, a detection angle associated with an X-ray path from the sample to the respective detection element; and assigning, for each of the plurality of detection elements of the array of detection elements, a respective X-ray intensity value measured at the respective detection element to the respective calculated detection angle; or wherein the array of detection elements is a two-dimensional array, the method further comprises:

calculating, for each column or row of the two-dimensional array, a detection angle associated with an X-ray path from the sample to the respective column or row; and assigning, for each column or row of the two-dimensional array, a respective X-ray intensity value measured at the respective row or column to the respective calculated detection angle.

3. The method of claim 1, further comprising carrying out an angular scan by moving the X-ray detector and the first slit relative to the sample.

4. The method according to claim 3, wherein the method of X-ray analysis is a method of grazing incidence X-ray diffraction analysis:

wherein the surface of the sample is irradiated by the parallel beam of incident X-rays at a grazing incidence angle; and the angular scan is carried out by moving the X-ray detector and the first slit relative to the sample while the parallel beam of incident X-rays irradiates the sample at the grazing incidence angle.

5. The method of claim 1 further comprising:

carrying out an angular scan by moving the X-ray detector and the first slit relative to the sample;

for each position of the angular scan:

calculating, for each of a plurality of detection elements of the array of detection elements, a detection angle associated with an X-ray path from the sample to the respective detection element;

assigning, for each of the plurality of detection elements of the array of detection elements, a respective X-ray intensity value measured at the respective detection element to the respective calculated detection angle; and optionally combining the X-ray intensity values that have been assigned to the same detection angle but measured at different detection elements to generate an X-ray intensity-detection angle scan; or generating a plot representing the measured X-ray intensities corresponding to each calculated detection angle at each detection element;

selecting a portion of the plot representing the sample; and generating an X-ray intensity-detection angle scan from the X-ray intensity data corresponding to the selected portion of the plot representing the sample.

6. The method of claim 1, wherein the array of detection elements is a two-dimensional array comprising rows and columns, the method further comprises:

carrying out an angular scan by moving the X-ray detector and the first slit relative to the sample;

for each position of the angular scan:

calculating, for each column or row of the two-dimensional array, a detection angle associated with an X-ray path from the sample to the respective column or row;

assigning, for each column or row of the two-dimensional array, a respective X-ray intensity value measured at the respective row or column to the respective calculated detection angle; and optionally combining the X-ray intensity values that have been assigned to the same detection angle but measured at different detection elements to generate an X-ray intensity-detection angle scan; or generating a plot representing the measured X-ray intensities corresponding to each calculated detection angle at each column or row of the two-dimensional array;

selecting a portion of the plot representing the sample; and generating an X-ray intensity-detection angle scan from the X-ray intensity data corresponding to the selected portion of the plot representing the sample.

7. The method according to claim 1, further comprising changing the measurement resolution by adjusting the width of the first slit;

wherein the first slit has an adjustable width, and preferably wherein the first slit is a motorised slit; or wherein the first slit is part of an adjustable-width slit arrangement, wherein the adjustable-width slit arrangement includes a second slit having a different width from the first slit, and the method further comprises replacing the first slit with the second slit to change the measurement resolution.

8. The method according to claim 1, wherein each respective detection angle is calculated using:

a reference angle between a line from the centre of a reference element through the first slit and a reference plane; and the ratio between the product of a pitch, d, of the X-ray detector and $\Delta n+1$, and the distance $L_1$;

wherein $\Delta n$ corresponds to the number of detection elements between the respective detection element and the reference element.

9. The method according to claim 1, wherein the method comprises:

carrying out a method of grazing incidence X-ray diffraction analysis according to claim 6; and making an X-ray reflectometry measurement.

10. The method according to claim 1 wherein the first slit is part of a slit arrangement, wherein the slit arrangement comprises a second slit adjacent to the first slit and at a distance $L_2$ from the X-ray detector;

the method further comprising:

passing a plurality of X-rays from the sample through the second slit, towards the X-ray detector;

detecting the plurality of X-rays passing through the first slit at a first region of the X-ray detector comprising the first detection element, and detecting the plurality of X-rays passing through the second slit at a second region of the X-ray detector comprising a second detection element;

for the first detection element, calculating the detection angle using the position of the first detection element relative to a first reference element;

for the second detection element, calculating a second detection angle associated with an X-ray path of an X-ray from the sample through the second slit to the second detection element, wherein the calculation of the second detection angle uses the distance $L_2$ and the position of the second detection element relative to a second reference element; and assigning a second X-ray intensity value measured at the second detection element to the second detection angle;

wherein the first and second reference elements are the centre element of the X-ray detector, or the first reference element is the centre element of the X-ray detector, and the second reference element is in the second region of the X-ray detector.

11. The method according to claim 10, wherein the slit arrangement further comprises a third slit positioned at a distance $L_3$ from the X-ray detector, wherein the first slit is positioned between the second slit and the third slit, the method further comprising:

passing a plurality of X-rays from the sample through the third slit, towards the X-ray detector;

detecting the plurality of X-rays passing through the third slit at a third region of the X-ray detector comprising a third detection element; and calculating a third detection angle associated with an X-ray path of an X-ray from the sample through the third slit to the third detection element, wherein the calculation of the third detection angle uses the distance $L_3$ and the position of the third detection element relative to a third reference element; and assigning a third X-ray intensity value measured at the third detection element to the third detection angle;

wherein the first, second and third reference elements are all the centre element of the X-ray detector, or the first reference element is the centre element of the X-ray detector, the second reference element is in the second region of the X-ray detector and the third reference element is in the third region of the X-ray detector.

12. An X-ray analysis apparatus for analysing a sample, the X-ray analysis apparatus comprising:

a processor configured to analyse data from an X-ray detector comprising an array of detection elements;

wherein the processor is configured to:

receive X-ray analysis data comprising an X-ray intensity detected at a first detection element of the array of detection elements;

calculate a detection angle based on the distance $L_1$ between a first slit and the X-ray detector, and the position of the first detection element in the array of detection elements; and assign an X-ray intensity value measured at the first detection element to the detection angle.

13. The X-ray analysis apparatus according to claim 12, further comprising:

an X-ray source for providing a parallel beam of X-rays;

a sample stage for supporting the sample;

the X-ray detector comprising an array of detection elements; and a first slit positioned between the sample and the X-ray detector;

wherein the X-ray detector is configured to detect a plurality of X-rays that pass from the X-ray source through the first slit; and the first slit is positioned at a distance $L_1$ from the X-ray detector.

14. The X-ray analysis apparatus according to claim 12, wherein the first slit has an adjustable width, and preferably wherein the first slit is a motorised slit; or wherein the first slit is part of a slit arrangement, wherein the slit arrangement includes a second slit having a different width from the first slit, wherein the first slit is configured to be replaced by the second slit and vice versa.

15. The X-ray analysis apparatus according to claim 12, wherein the apparatus is configured to carry out an angular scan of the sample by moving the X-ray detector and the first slit relative to the sample.

16. The X-ray analysis apparatus according to claim 15, wherein the processor is configured to:

determine a plurality of X-ray intensity profiles by, for each respective X-ray intensity profile, calculating a plurality of detection angles based on a respective estimated value of $L_1$;

calculate the full width half maximum of a measurement peak of each intensity profile to determine the measurement resolutions of the intensity profiles; and select the intensity profile with the lowest measured value for full width half maximum.

17. The X-ray analysis apparatus according to claim 15, wherein the processor is configured to:

accept an initial value of $L_1$ as an input;

calculate a detection angle or multiple detection angles using the initial value of $L_1$;

determine an intensity profile of X-ray intensity with respect to the or each calculated detection angle;

measure the full width half maximum of a measurement peak of the intensity profile to determine the measurement resolution;

repeat the steps of calculating a detection angle of multiple detection angles, determining an intensity profile and measuring the full width half maximum of a measurement peak of the intensity profile where the initial value of $L_1$ is replaced with an adjusted value of $L_1$ until the measurement resolution is below a resolution threshold.

18. A non-transitory computer readable storage medium having stored thereon a computer program comprising instructions configured to, when the program is executed by a computer, cause the computer to:

receive X-ray analysis data generated by an X-ray detector comprising an array of detection elements, the X-ray analysis data comprising an X-ray intensity detected at a first detection element of the array of detection elements;

calculate a detection angle based on the distance $L_1$ between a first slit and the X-ray detector, and the position of the first detection element in the array of detection elements; and assign an X-ray intensity value measured at the first detection element to the detection angle.

* * * * *